United States Patent
Krueger et al.

(10) Patent No.: US 6,449,692 B1
(45) Date of Patent: Sep. 10, 2002

(54) MICROPROCESSOR CIRCUITS, SYSTEMS, AND METHODS WITH COMBINED ON-CHIP PIXEL AND NON-PIXEL CACHE STRUCTURE

(75) Inventors: Steven D. Krueger, Dallas; Jonathan H. Shiell, Plano, both of TX (US); Ian Chen, Santa Clara, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/212,034

(22) Filed: Dec. 15, 1998

Related U.S. Application Data

(60) Provisional application No. 60/071,446, filed on Dec. 24, 1997.

(51) Int. Cl.[7] .............................. G06F 12/08
(52) U.S. Cl. .............. 711/122; 711/207; 711/133; 711/129; 345/543; 345/544; 345/568
(58) Field of Search ................. 711/122, 123, 711/207, 133, 144, 129; 709/104

(56) References Cited

U.S. PATENT DOCUMENTS

| | | | | |
|---|---|---|---|---|
| 4,965,717 A | * | 10/1990 | Cutts et al. ............. | 711/148 |
| 5,357,623 A | * | 10/1994 | Megory-Cohen ......... | 711/129 |
| 5,537,571 A |   | 7/1996 | Deville | |
| 5,579,473 A | * | 11/1996 | Schlapp et al. ........... | 345/535 |
| 5,581,725 A |   | 12/1996 | Nakayama | |
| 5,751,995 A | * | 5/1998 | Sarangdhar ............... | 711/145 |
| 5,796,978 A | * | 8/1998 | Yoshioka et al. .......... | 711/206 |
| 5,875,464 A | * | 2/1999 | Kirk ........................ | 711/129 |
| 6,038,645 A | * | 3/2000 | Nanda et al. ............. | 711/141 |

FOREIGN PATENT DOCUMENTS

| | | |
|---|---|---|
| EP | 0 466 265 A | 2/1992 |
| EP | 0 681 282 A | 11/1995 |

* cited by examiner

*Primary Examiner*—Matthew Kim
*Assistant Examiner*—Matthew D. Anderson
(74) *Attorney, Agent, or Firm*—Robert D. Marshall, Jr.; W. James Brady, III; Frederick J. Telecky, Jr.

(57) ABSTRACT

A computer system (8) comprising a central processing unit (12) and a memory hierarchy. The memory hierarchy comprises a first cache memory (16) and a second cache memory (26). The first cache memory is operable to store non-pixel-information, wherein the non-pixel information is accessible for processing by the central processing unit. The second cache memory is higher in the memory hierarchy than the first cache memory, and has a number of storage locations operable to store non-pixel information (26b) and pixel data (26a). Lastly, the computer system comprises cache control circuitry (24) for dynamically apportioning the number of storage locations such that a first group of the storage locations are for storing non-pixel information and such that a second group of the storage locations are for storing pixel data.

13 Claims, 3 Drawing Sheets

| VA | L3 PA | INFO TYPE 1b | STATUS 2b | ECC Xb | MAP 1b | LINK Nb | PIXEL SIZE Tb |

MICROPROCESSOR CIRCUITS, SYSTEMS, AND METHODS WITH COMBINED ON-CHIP PIXEL AND NON-PIXEL CACHE STRUCTURE

CROSS-REFERENCES TO RELATED APPLICATIONS

This application claims priority under 35 USC §119(e)(1) of Provisional Application No. 60/071,446, filed Dec. 24, 1997.

Not Applicable.

STATEMENT REGARDING FEDERALLY SPONSORED RESEARCH OR DEVELOPMENT

Not Applicable.

BACKGROUND OF THE INVENTION

The present embodiments relate to microprocessors and microprocessor-based systems, and are more particularly directed to microprocessor circuits, systems, and methods with a combined on-chip pixel and non-pixel cache structure.

Microprocessor technology continues to advance at a rapid pace, with consideration given to all aspects of design. Designers constantly strive to increase performance, while maximizing efficiency. With respect to performance, greater overall microprocessor speed is achieved by improving the speed of various related and unrelated microprocessor circuits and operations. For example, one area in which operational efficiency is improved is by providing parallel and out-of-order instruction execution. As another example, operational efficiency also is improved by providing faster and greater access to information, with such information including instructions and/or data. The present embodiments are primarily directed at this access capability and, more particularly, to improving and equalizing access by the same microprocessor to various types of information including instructions, non-pixel data, and pixel data.

One common approach in the field of modem high performance data processing systems is to implement the system using a single-chip microprocessor as the central processing unit (CPU), and using external semiconductor random-access memory (RAM) as main system memory. The main system memory is generally implemented in the form of random access memory (RAM) devices such as dynamic RAM (DRAM), which are of high density and low cost-per-bit; however, the latency and bandwidth of conventional DRAM memory are sometimes less than desirable or acceptable, and often are not able to keep up with the clock rates of modem microprocessors. Thus, other memory considerations are also now involved when developing additional aspects of the system design as better appreciated below.

Another very common approach in modem computer systems directed at improving access time to information is to include one or more levels of cache memory within the system, where this approach is substantially faster as compared to access to data in main memory. Cache memories are typically relatively small blocks of high speed static RAM (SRAM), either on-chip with the microprocessor or off-chip (or both), for storing the contents of memory locations that are likely to be accessed in the near future. Typically, cache memory also stores the contents of memory locations that are near neighbors to a memory location that was recently accessed; because microprocessors often access memory in a sequential fashion, it is likely that successive memory accesses in successive cycles will access memory addresses that are very close to one another in the memory space. Accordingly, by storing the neighboring memory location contents in a cache, a good portion of the memory accesses may be made by the microprocessor to cache, rather than to main memory. The overall performance of the system is thus improved through the implementation of one or more cache memories. Most modem microprocessor systems include multiple levels of cache memory (either on or off-chip), with the capacity of the cache increasing (and its speed decreasing) with each successive level, to optimize performance. Typically, the lowest level cache (i.e., the first to be accessed) is smaller and faster than the cache or caches above it in the hierarchy, and the number of caches in a given memory hierarchy may vary. In any event, when utilizing the cache hierarchy, when an information address is issued, the address is typically directed to the lowest level cache to see if that cache stores information corresponding to that address, that is, whether there is a "hit" in that cache. If a hit occurs, then the addressed information is retrieved from the cache without having to access a memory higher in the memory hierarchy, where that higher ordered memory is likely slower to access than the hit cache memory. On the other hand, if a cache hit does not occur, then it is said that a cache "miss" occurs. In response, the next higher ordered memory structure is presented with the address at issue. This action may occur after, or during the same time with, the addressing of the lower level cache. If this next higher ordered memory structure is another cache, then once again a hit or miss may occur. If misses occur at each cache, then eventually the process reaches the highest ordered memory structure in the system, at which point the addressed information may be retrieved from that memory.

By way of further background, another manner of improving efficiencies with respect to modern computers is through the use of a so-called unified memory architecture ("UMA"). More particularly, one factor in the overall system costs includes the various types and number of memory structures, including the cache systems mentioned above. However, another consideration is the implementation of what is sometimes referred to as video memory or pixel memory, that is, the type of storage resource utilized for storing pixel data (i.e., data for driving some type of image display such as a cathode ray tube monitor or other type of display). Under a UMA system, the pixel data is mapped directly to, and stored in, the system main memory. This choice is an alternative to providing a separate pixel memory, which is typically external from the microprocessor and dedicated solely for inputting and outputting pixel data. Therefore, the UMA system eliminates the need or existence in the system of this additional memory structure, where that structure is dedicated solely for pixel data. This approach is typically perceived as favorable because, despite the potential slower access to main memory, the cost of larger main memory is typically considerably less than requiring a separate pixel memory. Note, however, that the UMA system may be considered to have certain drawbacks in particular contexts. For example, because of its direct mapping of the pixel data, a fixed amount of the address space of the system main memory is unavailable for other types of data, because that address space is necessarily dedicated to pixel data. As another example, typically the system main memory is accessible only via a single bus and, therefore, a single access at a time may be made only to one or the other of the pixel data or the non-pixel data stored in the memory structure.

In view of the above, the present inventors have recognized various limitations of the above factors regarding memory systems. Thus, below are presented various inventive embodiments which permit improve efficiency in various contexts as measured against these prior art drawbacks as well as others which will be appreciated by one skilled in the art.

BRIEF SUMMARY OF THE INVENTION

In one embodiment, there is a computer system comprising a central processing unit and a memory hierarchy. The memory hierarchy includes a first cache memory and a second cache memory. The first cache memory is operable to store non-pixel information, wherein the non-pixel information is accessible for processing by the central processing unit. The second cache memory is higher in the memory hierarchy than the first cache memory, and has a number of storage locations operable to store non-pixel information and pixel data. Lastly, the computer system comprises cache control circuitry for dynamically apportioning the number of storage locations of the second cache memory such that a first group of the storage locations are for storing non-pixel information and such that a second group of the storage locations are for storing pixel data. Other circuits, systems, and methods are also disclosed and claimed.

DETAILED DESCRIPTION OF THE INVENTION

Figures 1, 2:
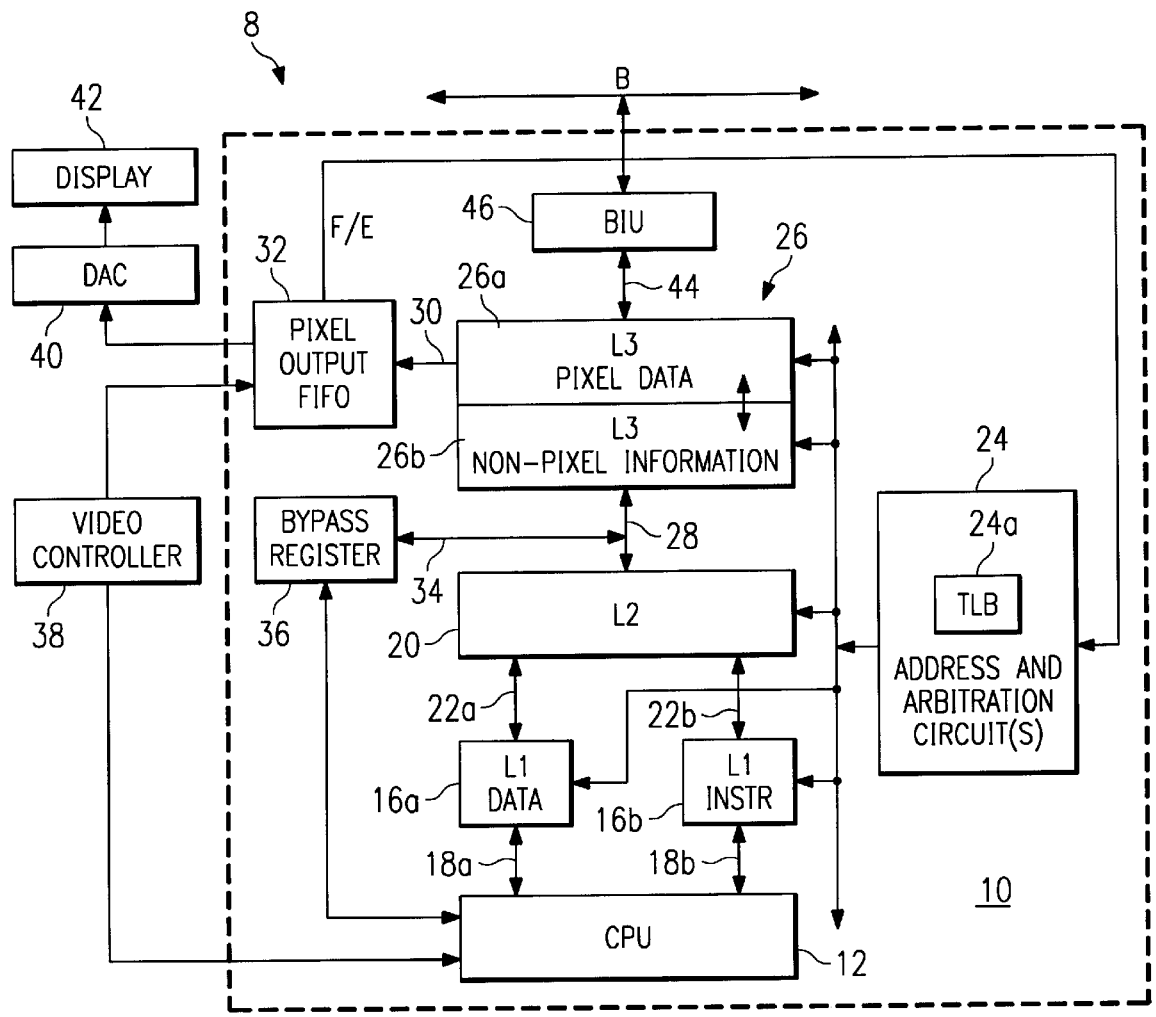
FIG. 1 illustrates an electrical block diagram of a system including a microprocessor on a single integrated circuit chip in accordance with the present embodiments, where the microprocessor includes three levels of cache memory and the highest level of the cache memory is operable to store both pixel and non-pixel data.
FIG. 2 illustrates a diagrammatic representation of various tag bits stored in a translation lookaside buffer and corresponding to each line of data stored in the third level of cache memory in the microprocessor of FIG. 1, wherein those tag bits are preferably stored in a translation lookaside buffer which provides mapping to the third level cache.

FIG. 1 illustrates a block diagram of a computer system 8 in accordance with the present embodiments, and which includes a single integrated circuit microprocessor designated generally at 10. As a matter of introduction, note that the functionality of microprocessor 10 may be included within various types of microprocessor structures, with such types ascertainable by one skilled in the art. Accordingly, various details related to such a microprocessor other than in connection with the memory and other related components of FIG. 1 are neither shown nor explained in order to simplify the present discussion. Lastly, note that while various aspects of microprocessor 10 are shown included within its single integrated circuit configuration, various alternative embodiments may be derived where some of those features are formed on circuits external from the microprocessor.

Turning to the blocks shown in FIG. 1, microprocessor 10 includes a central processing unit ("CPU") 12. CPU 12 may include various pipeline stages (e.g., instruction fetching, decoding, scheduling, and execution), but for purposes of the present embodiments the details of such stages need not be explored with it instead only noted that one or more of such stages generally provide access to and from various levels of cache memory as appreciated below. In general, these various levels of cache memory plus main memory (not shown) define a memory hierarchy, where the general concepts of hierarchical cache memory systems are known in the art. In such a hierarchy, reads of data from memory, or writes of data to memory, are attempted first from a lowest ordered storage system and progressively upward to higher ordered storage systems, continuing until the data (or the place to where it should be stored) is successfully located. As appreciated below, however, various aspects of the cache hierarchy of the present embodiments differ from the prior art and, indeed, provide various benefits as discussed later.

At the lowest level of the memory hierarchy is an L1 cache designated generally at 16. The "L1" indication demonstrates the matter of memory hierarchy as is known in the art. Specifically, cache circuits with a lower numerical designation are commonly closer to the execution unit of the microprocessor pipeline (not shown) as compared to cache circuits with a higher numerical designation, such as the L2 and L3 cache circuits discussed later. Moreover, the numerical designation of the cache provides an ascending indication of the order in which the caches are accessed by stages of the CPU instruction pipeline when it is either reading data from, or writing data to, the caches. Thus, such an access first occurs to an L1 cache and, if a cache miss occurs to that cache, it is followed by an access to an L2 cache, and so forth through the memory hierarchy until a hit is found in either a cache or other memory structure. In the preferred embodiment, L1 cache 16 is separated into two separate memory structures, with a first structure forming an L1 data cache 16a and a second structure forming an L1 instruction cache 16b. In an alternative embodiment, however, these two structures could be combined to form a unified cache. Returning to L1 data cache 16a and L1 instruction cache 16b, each is connected via a respective bus, 18a and 18b, to CPU 12. In the preferred embodiment, each of L1 data cache 16a and L1 instruction cache 16b is preferably a 2-way set associative cache operable to store a total of 8 Kbytes of data in 32 byte blocks, and with each way operable to output 128 bits (i.e., 16 bytes) at a time. Note also with respect to caches 16a and 16b that the name of each designates the type of information stored by the corresponding cache. More particularly, data cache 16a is preferably limited to storing cacheable data in the sense as used in current microprocessors, but not to include instructions. In contrast, instruction cache 16b is preferably limited to storing instructions to be fetched into, and executed by, CPU 12.

Microprocessor 10 further includes an L2 unified cache 20, and which is connected to L1 data cache 16a via a bus 22a and to L1 instruction cache 16b via a bus 22b. Note that the L2 cache is referred to as a "unified" cache because in addition to storing data (which includes address translation information) it stores instructions. In the preferred embodiment, L2 unified cache 20 is preferably a 4-way set associative cache operable to store a total of 64 Kbytes of information in 64 byte blocks and 32 byte sub-blocks, and with each way operable to output 256 bits (i.e., 32 bytes) at a time.

Having noted the first two different levels of caches in FIG. 1, note further that each such cache 16, and 20, is also connected to an address and arbitration circuit 24. Arbitration circuit 24 is included in general to demonstrate the functionality of one or more cache control circuits which permit addressing of the different caches by CPU 12 according to known manners so that the hierarchy is properly maintained by first addressing lower prioritized caches and also addressing higher ordered caches in the event of a lower cache miss. Thus, given the statements in this document of the arbitration and/or prioritization methods, various circuit implementations may be used to construct arbitration circuit 24 using knowledge in the art. In addition, note that arbitration circuit 24 includes a translation lookaside buffer ("TLB") 24a. TLB 24a operates in general as known in the art, that is, it stores previously determined address translations (along with corresponding tags), that is, translations of logical addresses to corresponding physical addresses. These translations may be directed to addressing L1 cache 16 and L2 cache 20 in a manner known in the art. Additionally, TLB 24a provides address translations as are also known in the art, but these translations are used to address an additional cache circuit described later and consistent with the present inventive embodiment. Still further, and as detailed later, the entries of TLB 24a as directed to this additional cache are preferably further modified to include additional tag information to support various additional functionality. Lastly, note that address and arbitration circuit 24 may include additional circuitry to the extent necessary to accomplish the memory access functionality described below, where such additional circuitry may be ascertained by one skilled in the art given current cache controllers as well a s the additional functional descriptions s et forth in this document.

Given the above, one skilled in the art will at this point appreciate that CPU 12 may address two levels of cache memory to read and write information (e.g., data, instructions, address translation information) in a hierarchical manner. In this regard, the access to the these caches may be in various known manners, or in other manners taught by patents also assigned to the assignee of the current patent. For one such example, therefore, the reader is referred to U.S. Provisional Patent Application No. 60/029,231, entitled "Microprocessor Circuits, Systems, And Methods With Reduced Cache Read Time," with Mr. Patrick W. Bosshart as its inventor, and filed on Oct. 31, 1996, and which is hereby incorporated herein by reference.

In addition to the two levels of cache memory introduced thus far, note now that the present embodiment further includes a third level of cache memory, indicated generally as L3 cache 26. In the preferred embodiment, L3 cache 26 is a direct mapped memory to simplify the structure given its size (i.e., as opposed to a set associative structure as are the above-introduced cache structures), and is operable to store a total of 5 Mbytes of information. Also in the preferred embodiment, L3 cache 26 is page oriented such that each of its blocks stores 4 Kbytes of information. Note also that some authors refer to such blocks in a non-sublocked cache as a cache line. In any event, each of the 4 Kbyte blocks is preferably sub-blocked such that its sub-blocks match the block size of L2 cache 20; therefore, each block in L3 cache 26 includes 64 byte sub-blocks, giving rise to a total of 64 sub-blocks per block (i.e., 64 byte sub-block *64 sub-blocks =4 Kbytes). Thus, in the preferred embodiment, L3 cache 26 is operable to output from one to 64 of these 64 byte sub-blocks in a single access, where note that a single access may require more than one cycle. With respect to outputting information from L3 cache 26, note that it may provide its output to one of three different destinations. First, L3 cache 26 may output up to 64 sub-blocks, one per cycle, via a bus 28, to L2 cache 20. Second, L3 cache 26 may output up to 64 sub-blocks, with multiple sub-blocks per cycle, via a bus 30, to a pixel output FIFO 32. Pixel output FIFO 32 is a storage device operable to input in parallel fashion multiple blocks of information, and is further operable to output this information in serial fashion for reasons more apparent later. Third, L3 cache 26 may output up to 64 sub-blocks, via a bus 34, one per cycle, to a bypass register 36. Bypass register 36 is a standard storage register operable to input and output either part or all of a group of information in parallel fashion. Lastly, note that bus 34 is bi-directional and, thus, information may be written from bypass register 36 to L3 cache 26.

Completing the illustration of FIG. 1 in general, L3 cache 26 is further connected by way of a bus 44 to a bus interface unit ("BIU") 46 which is connected to a bus B. Bus B extends external from microprocessor 10 and, therefore, may control and perform communication between microprocessor 10 and other elements external from the microprocessor, including an external memory which would be higher in the memory hierarchy than L3 cache 26 (and, of course, also higher than the lower level caches as well). At this point, any additional elements external from the microprocessor are not detailed for sake of simplicity, with examples of such elements being easily ascertainable by one skilled in the art.

Having introduced the physical size and connections of L3 cache 26, it has been discovered in connection with the present embodiments that it is favorable to form L3 cache 26 to include two different storage areas 26a and 26b. More specifically, while the overall size of L3 cache 26 is fixed (e.g., at 5 Mbytes), in the preferred embodiment this fixed size is apportioned between the two different storage areas 26a and 26b. What differs between these two storage areas 26a and 26b is the type of information which is permitted to be written to each such area. Particularly, in the preferred embodiment, storage 26a is operable only to store a type of information which is referred to in the current art as video data or more precisely, as pixel data. As known in the art, pixel is an abbreviation for a picture element, where the picture element represents a single point for display such as on a computer monitor or other display device. In current prior art systems, such pixel data is stored externally from a microprocessor, such as in main memory in a UMA system or in some other memory structure, external from the microprocessor, such as a memory on a video graphics card. In contrast, in the present embodiment, this type of pixel data may be stored in the structure identified at 26a and, thus, this structure is hereafter referred to as a pixel data storage area 26a. In contrast, however, storage area 26b is operable to store information other than pixel data and which is the type of information typically stored within cache structures under, contemporary technology (e.g., instructions, address translations, non-pixel operands, etc.). Thus, structure 26b is hereafter referred to as a non-pixel information storage area 26b. Lastly, having introduced the separate nature of areas 26a and 26b, note further that the depiction of these areas as separate from one another is preferably implemented in a logical, rather than physical, manner. In other words, storage area 26 is in its entirety a single storage area, but either contiguous or non-contiguous locations of that area may be assigned to either pixel data storage area 26a or non-pixel information storage area 26b. This assigning of address space as well as the the amount of storage available for each of storage areas 26a and 26b is discussed below.

As an additional aspect of L3 cache 26, note that the apportionment of storage space between storage areas 26a and 26b is preferably dynamically configurable under the present embodiments. In the preferred embodiment, the dynamic configuration is based on the video setup of the computer environment in which microprocessor 10 is implemented. More specifically, note now that microprocessor 10 is further connected to communicate with a video controller 38 and, more particularly, CPU 12 of microprocessor 10 is connected in this manner. In the preferred embodiment, video controller 38 represents one or more circuits typically implemented by a video microcontroller (sometimes referred to as a graphics controller) and, therefore, is operable to perform various functions associated with using pixel data such as address and video timing signal generation. Video controller 38 is preferably programmable and, thus, while not shown, includes registers for storing parameters to program its functionality where such registers receive such information from conductors or a bus such as bus B (although the connection is also not shown). Additionally, while video controller 38 is shown to be external from microprocessor 10, note that either part or all of its functionality could be included within the single integrated circuit which forms microprocessor 10. Also in this context and for reasons more apparent later, note further that pixel output FIFO 32 is connected to an externally located conventional digital-to-analog converter ("DAC") circuit 40. DAC 40 operates in the manner known in the video art as a device often referred to as a video RAM DAC, that is, a device which receives digital pixel data in serial fashion from a RAM and converts that data to provide corresponding analog signals to a display device. In this last regard, note in the preferred embodiment that DAC 40 is connected to provide its output to a display device 42, where display device 42 may be selected from various types of displays as may be ascertained by one skilled in the art. Indeed, note further that while FIG. 1 depicts this digital to analog conversion attribute, an alternative embodiment may be constructed within the present teachings wherein the display accepts digital rather than analog signals, in which case the conversion performed by DAC 40 would not be necessary. In any case, and returning to the connection between CPU 12 and video controller 38, the present embodiment contemplates that CPU 12 has access to settings made in connection with video controller 38 which indicate the type of video mode being used by microprocessor 10 at any given time. For this reason, video modes are introduced immediately below with a subsequent discussion of the dynamic configuration of L3 cache 26 under the preferred embodiment in response to that mode.

It is known in the video art that a video mode defines an amount of necessary pixel memory given the number of bits per pixel. In this regard, note that pixel data is commonly grouped such that a single pixel is represented by 8, 16, 24, or 32 bits. Under the prior art for a non-UMA system, typically this mode is associated with a graphics computer card having a certain amount of dedicated memory. For example, under contemporary standards, a graphics card with 1 Mbytes of pixel memory defines a 1 Mbyte video mode for that 1 Mbyte memory. In other words, 1 Mbytes of pixel memory is available for storing pixel data and, therefore, various system constraints must be maintained so as not to exceed the limitations provided by the 1 Mbytes of memory. As one such Innitation, since the memory is limited to 1 Mbytes, the system software (either automatically or via user input) must ensure that the resolution of the pixel display is not too high given the number of colors being used by the system. Thus, if a user of a 1 Mbyte video mode (e.g., graphics card) has chosen an 8-bit color scheme, then the user may use a screen resolution of 1024 by 768 pixels since that will require only on the order of 768 Kbytes of the pixel memory. On the other hand, that same user could not select that same screen resolution if the user desired 64K colors (i.e., 16 bits per pixel), since the total memory thereby required (i.e., approximately 1.5 Mbytes) would exceed that provided by the video mode (i.e., 1 Mbyte). Of course, this user could select a lesser resolution, such as 800 by 600 pixels, in which case the 64K colors could be accommodated.

Having introduced video modes, reference now is made to the apportionment of memory space of L3 cache 26 as between pixel data storage area 26a and non-pixel information storage area 26b. First, recall that CPU 12 is connected to be able to receive, from video controller 38 by way of example, an indication of the current video mode, that is, the video mode under which video controller 38 is then operating. Second, recall also that TLB 24a includes, as further detailed below, information directed to addressing L3 cache 26. Given these features, under the preferred embodiment and in response to the video mode detected, CPU 12 provides an indication to TLB 24a so that the latter apportions a first amount of memory space to pixel data storage area 26a and apportions the remaining space of L3 cache 26 to non-pixel information storage area 26b. For example, in the instance where L3 cache 26 is 5 MBytes as provided above, then Table 1 below depicts for a 1024 by 768 display the breakdown of a mode as defined by the number of bits per pixel and the apportionment of these 5 MBytes of storage.

TABLE 1

| Mode | Storage for pixel data storage area 26a (assuming 1024 by 768 resolution) | Storage for non-pixel information storage area 26b |
| --- | --- | --- |
| A (8 bits) | 0.75 MBytes | 4.25 MBytes |
| B (16 bits) | 1.5 MBytes | 3.5 MBytes |
| C (24 bits) | 2.25 MBytes | 2.75 MBytes |
| D (32 bits) | 3 MBytes | 2 MBytes |

In Table 1, letters are used merely by way of referring to a given video mode, where that mode may be reflected by video controller 38 to CPU 12 in various manners and, for the present example, is based on the number of bits per pixel. In any event, given Table 1, assume that CPU 12 detects from video controller 38 that it is in mode A. In response, CPU 12 issues sufficient information to TLB 24a such that the address translations it provides, as directed to L3 cache 26, limit the amount of storage for pixel data storage area 26a to 0.75 MBytes of pixel data. In addition, therefore, the remaining 4.25 MBytes of the total 5 MByte structure are apportioned for non-pixel data to be stored in non-pixel information storage area 26b. Note the circuitry to effect this change and the limits imposed by the change may be accomplished in various manners as will be ascertainable by one skilled in the art. For example, various registers or tables may be implemented within TLB 24a which are established and then re-established to properly apportion the physical addresses of L3 cache 26 to maintain the desired separation of areas 26a and 26b. In any event, the remaining modes of B through D will therefore be appreciated by one skilled in the art. In addition, note that Table 1 is merely by way of example, and that other modes could be included and the size of L3 cache 26 in its entirety also could be modified. In any event, the preferred embodiment could be modified so that in each of these scenarios the apportionment of L3 cache 26 is dynamically alterable in response to the video mode under which the system which includes microprocessor 10 and video controller 38 is operating.

Having illustrated the aspect of apportionment of storage space between the two storage areas of L3 cache 26, attention is now directed to the access and output of the information stored in those areas. When some type of information is desired by CPU 12 (i.e., either pixel or non-pixel), then CPU 12 issues a logical address to address and arbitration circuit 24. Moreover, note that some other addressing device may place a requested address on the address bus and, thus, CPU 12 is only used by way of example. Looking now to the effect of the logical address, it is directed to TLB 24a of address and arbitration circuit 24. In response, assuming that TLB 24a has earlier stored a valid response to this logical address, then it outputs a physical address for use in accessing both L1 cache 16 and L2 cache 20, and also a tag for L3 cache 26. In one embodiment, the application of the physical addresses to L1 cache 16 and L2 cache 20 proceeds in the manner known in the art, that is, there is a determination if there is hit in L1 cache 16 by comparing the physical address to addresses stored in a tag memory associated with L1 cache 16 and in the case of a hit the information is output from that cache; alternatively, if there is a miss in L1 cache 16 then the information is output from L2 cache 20 if there is a hit in that cache. These lower caches being understood in the art, the preferred embodiment is further directed to having the dynamically alterable structure of L3 cache 26 and, thus, the following discussion focuses on the addressing and outputting of information from that structure. Additionally, in an alternative embodiment to seeking the addressed information in L1 cache 16 and L2 cache 20, if it is determined (e.g., from the L3 cache tag) that the addressed information is pixel data, then L1 cache 16 and L2 cache 20 need not be investigated since, by definition, those caches do not store pixel data. Thus, instead, the process may continue with an access of L3 cache 26, as further appreciated below.

Assuring there is a miss in both L1 cache 16 and L2 cache 20 (or it is known that the addressed information is pixel data), the tag information from TLB 24a (assuming such tag information was available in TLB 24a) which corresponds to the logical address at issue identifies information in L3 cache 26 to be output in response to the logical address from CPU 12. Before proceeding, note in the preferred embodiment that the tag information corresponding to an entry in L3 cache 26 preferably includes, among other things detailed later in FIG. 2, an information type indicator which may be implemented by a single bit. The information type indicator, when in a first binary state (e.g., 0), indicates that the corresponding information is non-pixel information and, when in a second binary state (e.g., 1), indicates that the corresponding information is pixel data. Given the existence of the type indicator bit in the TLB 24a tag, the operation of L3 cache 26 responds in a first manner for an indicator depicting that the information being addressed is non-pixel information and in a second manner for an indicator depicting that the information being addressed is pixel data. Each of these alternatives is discussed below.

When a logical address is issued by CPU 12, a miss has occurred in L1 cache 16 and L2 cache 20, and a valid tag has been output by TLB 24a which includes an information type indicator indicating that the addressed information in L3 cache 26 is non-pixel information, then the path of the addressed information depends further on whether the operation request which accompanies the issuance of the address on the address bus is a read or a write. Looking first to the instance of a read, then the addressed information in L3 cache 26 is preferably presented by L3 cache 26 to one of two different destinations, where each of the destination was introduced earlier. Before revisiting those destinations, note more specifically that since the addressed information is non-pixel information, then it is accessed from non-pixel information storage area 26b of L3 cache 26, that is, it is accessed from that portion of L3 cache 26 which was earlier apportioned to store only non-pixel information. Looking now to the first destination of the addressed information from non-pixel information storage area 26b in the instance of a read, L3 cache 26 may output the addressed information via bus 28 to bypass register 36. Looking now to the second destination of the addressed information from pixel non-information storage area 26b in the instance of a read, L3 cache 26 may output the addressed information via bus 28 to L2 cache 20. Given the above, one skilled in the art should appreciate that the addressed information is immediately available to CPU 12 via bypass register 36, or may pass to a lower level cache starting with L2 cache 20. Also in this regard, note that while bypass register 36 is shown as a separate storage device to provide this functionality, a comparable result could be achieved in an alternative embodiment which includes bypass circuitry from bus 28 through the path of L2 cache 20 and L1 cache 16 whereby those cache structures could be bypassed for immediate access to the addressed information by CPU 12. Given the above discussion of the information path for a read, one skilled in the art should appreciate an information path in the opposite direction for a write. In other words, if CPU 12 provides an address which results in a hit of non-pixel information in L3 cache 26 and the operation request type is a write, then the non-pixel information may be issued from CPU 12 to bypass register 36, and from that point may be transferred to non-pixel information storage area 26b.

When a logical address is issued by CPU 12, a miss has occurred in L1 cache 16 and L2 cache 20, and a valid tag has been output by TLB 24a which includes an information type indicator indicating that the addressed information in L3 cache 26 is pixel information, then the path of the addressed information once again depends further on the operation request which accompanies the issuance of the address on the address bus. However, note that because pixel data is involved, in addition to a read or a write operation there may be a third operation referred to herein as a display operation. Moreover, the paths for the examples of read and write are the same as that discussed above for non-pixel information, with one exception being that the subject data is either read from, or written to, pixel data storage area 26a rather than non-pixel information storage area 26b and another exception being that pixel data when read from storage area 26a preferably reaches CPU 12 via bypass register 36 and does not pass through L2 cache 20 and L1 cache 16 since those caches in the preferred embodiment do not store pixel data. In any event, therefore, the reader is referred to the preceding discussion for more detail regarding reading and writing. Turning now to the instance where pixel data is addressed for the display operation, then the addressed data is preferably presented by L3 cache 26 to pixel output FIFO 32. Here, note that since the addressed information is pixel data, then it is accessed from pixel data storage area 26a of L3 cache 26, that is, it is accessed from that portion of L3 cache 26 which was earlier apportioned to store only pixel data. Returning now to the destination of the addressed pixel data to pixel output FIFO 32, one skilled in the art may now appreciate that FIFO=s output capability. More particularly, note that pixel output FIFO 32 is connected to receive one or more control signals from video controller 38, and recall that video controller 38 can provide, among other things, timing control signals. Thus, once pixel data is output from L3 cache 26 to pixel output FIFO 32, these control signals are issued to cause pixel output FIFO 32 to output this pixel data to DAC circuit 40. As described earlier, in response DAC circuit 40 converts the serial data to the appropriate analog signals to drive display device 42, thereby presenting the pixel data as an image output to a user. Lastly, note that pixel output FIFO 32 also provides a full/empty control signal (abbreviated F/E in FIG. 1) to address and arbitration circuit 24. More particularly, when pixel output FIFO 32 is empty or approaching empty it may indicate this status to address and arbitration circuit 24 so that the next pixel data address is issued to L3 cache 26 so that additional pixel data may be output to pixel output FIFO 32 and for display in the same manner as described immediately above.

Given the above operational description, one skilled in the art should now appreciate numerous benefits of the preferred embodiment. As a first example of a benefit of the preferred embodiment, pixel data may be accessed more readily by a CPU (e.g., CPU 12) than compared to prior art systems which require such data to be stored only in storage circuits which are external from the microprocessor. In other words, the pixel data in the preferred embodiment becomes cacheable data, whereas under current technology such data is commonly considered non-cacheable and therefore is not permitted to be stored in either an on-chip or off-chip cache structure. In those systems where pixel data is non-cacheable, access to such data is constrained by limitations such as the bus limitations and access times to the non-cache structures storing the pixel data. In contrast, in the preferred embodiment, it may be easily appreciated that pixel data stored in pixel data storage area 26a is as easily and readily accessed as is non-pixel information stored in non-pixel information storage area 26b. As a second example of a benefit of the preferred embodiment, the amount of storage available for both pixel data and non-pixel information is dynamically alterable. This also contrasts with the prior art. For example, in a prior art system using dedicated or fixed mappings in memory for pixel data, then the video modes available to the system may be limited because the fixed amount of pixel storage may limit the Video modes which are permissible given the available storage. By contrast, under the preferred embodiment and assuming L3 cache 26 is sufficiently large, this limitation may be overcome by apportioning sufficient storage area of L3 cache 26 to store pixel data. Moreover, note that the ability to dynamically alter the apportionment of L3 cache 26 further supports this benefit as well as provides other benefits. Particularly, to accommodate a certain video mode, L3 cache 26 may be apportioned while still permitting either a relatively large or relatively small amount of space to be used in the cache for non-pixel information. This is in contrast to a dedicated pixel memory which, even if not fully used at a given time, provides no additional storage space for non-pixel information. Still further, while the preferred embodiment apportions L3 cache 26 based on the current video mode of operation, note that other instances could possibly arise where it would be desirable to apportion its space as between pixel data and non-pixel information, and these instances likewise may provide benefits over the prior art. As a third example of a benefit of the preferred embodiment, the enhanced video capabilities will be even further improved and are easily modified as the ability to construct on-chip memories continues to improve. In other words, while the 5 MByte value provided above may be suitable for various contemporary applications, the present embodiment may be enhanced still further in the future as various factors contribute to the ability to acceptably increase the size of memories constructed on the same integrated circuit as the microprocessor functionality, thereby providing for a total cache far larger than 5 MBytes. In this case, the larger structure in some instances may apportion a great majority of its storage capacity to pixel data while still also providing a fallback position of additional storage for non-pixel information. Still further, additional benefits will be appreciated as arising from yet additional aspects of the preferred embodiment as detailed below with respect to pixel data tag information and other operational aspects of L3 cache 26.

An additional aspect arises in connection with the preferred embodiment in relation to snooping of information stored in L3 cache 26. Particularly, as a cache structure, it is desirable to maintain proper memory coherency, that is, to ensure that any copy of information in L3 cache 26 either matches that which is stored in a higher level memory (e.g., main memory) or ultimately is output to update the copy in higher memory to preserve information integrity. In this regard, therefore, note that address and arbitration circuit 24 further includes appropriate circuitry to permit snooping of L3 cache 26, and that such snooping applies to both pixel data in pixel data storage area 26a and non-pixel information in non-pixel information storage area 26b. Snooping is known in the art, and generally includes two different types of snoop requests, each of which is associated with one or more memory locations identified by an explicit address that accompanies or corresponds to the snoop request. As to the two types of snoop requests, generally a first type of such a request indicates to a cache or caches (e.g., including L3 cache 26) that the requesting circuit seeks to share the addressed information. If L3 cache 26 does not have a copy of the addressed information, then it simply takes no action with respect to the request. On the other hand, if L3 cache 26 does have a copy of the addressed information and that information has been modified since the time it was stored in the cache, then L3 cache 26 outputs the addressed information, via BIU 46 and bus B, to main memory (not shown in FIG. 1). Therefore, the requesting circuit may then read the addressed information from main memory (or "snarf" it from the bus as it is being written from the cache to the main memory). The second type of snoop request indicates to a cache or caches (including L3 cache 26) that the requesting circuit seeks the addressed information and will change that information. Once again, if L3 cache 26 does not have a copy of the addressed information, then it simply takes no action with respect to the request. On the other hand, if L3 cache 26 does have a copy of the addressed information and that information has been modified since the time it was stored in L3 cache 26 (i.e., the copy of the information is "dirty" as referred to in the art), then the cache also outputs the addressed information to main memory. However, note that because the requesting circuit will change the information, L3 cache 26 also must invalidate its own copy of the information to prevent subsequent use of information that has been changed.

FIG. 2 illustrates various fields of information which may be included in each entry for TLB 24a which corresponds to an entry in L3 cache 26. At the outset, note that some fields of the TLB information are directed to both pixel data and non-pixel information while other fields of the information are directed only to pixel data, as will be apparent from the following discussion. Generally, FIG. 2 illustrates eight information fields, where each of those fields may be encoded in binary form using one or more bits per field.

Additionally, the first two fields (i.e., the ones shown farthest to the left in FIG. 2) relate to address detection while the remaining seven fields characterize the data corresponding to the TLB entry. Each of these fields is described below.

Looking now to the first two information fields, the first information field is a virtual address comparator (abbreviated VA) while the second information field is the corresponding physical address (abbreviated PA) in L3 cache 26. In other words, for a given TLB entry, the physical address identifies the particular block (or line) in L3 cache 26 which is described by the remaining field in the entry. Note that the inclusion of this physical address (sometimes referred to as a block and offset identifier) in TLB 24 is one beneficial aspect of the preferred embodiment. Specifically, by including the physical address in TLB 24, there is not a separate tag comparison required when accessing L3 cache 26. Thus, there is not an additional required period of time expended for such a tag comparison. In the preferred embodiment, this approach is implemented by using the same length for the virtual address which is compared to both the cache tags as well as the entries in TLB 24.

The third tag field is the one bit information type identifier described earlier. Recall that the state of this one bit indicates whether the block of information, as stored in L3 cache 26, and corresponding to the TLB entry, is either pixel data or non-pixel information. As to the remaining seven information fields, each is discussed below. Before proceeding, however, note that while FIG. 2 illustrates eight information fields for the preferred embodiment, one skilled in the art may modify the TLB entries to include more or less fields based on a given implementation. Indeed, in this regard, note that to effect the snooping concepts described above, it is further preferable that each tag entry include sufficient indicators such as those used to implement the known MESI cache coherency protocol. Additionally, it is also preferred that MESI information is maintained for each sub-block in L3 cache 26 rather than on a per block basis.

The fourth field of the tag information in FIG. 2 is preferably a two bit status field. The status field indicates the ability, or lack thereof, to either read or write the block in L3 cache 26 corresponding to the tag information. More specifically, in the preferred embodiment there are four possible status indications, as shown by the following Table 2.

TABLE 2

| STATUS field | Status of L3 cache 26 entry |
| --- | --- |
| 00 | Read, write, and replace all permitted |
| 01 | Read and write permitted; replace not permitted |
| 10 | Read permitted; no write or replace permitted |
| 11 | Read permitted, no MESI state change permitted |

From a review of Table 2, one skilled in the art will appreciate the meaning of the four different status scenarios. For example, a TLB status field equal to 00 indicates that the corresponding block of information in L3 cache 26 may be read, written, or replaced. With respect to the difference between writing and replacing, note that the writing to the block of information means that the information is changed, but only with other information which corresponds to the same address as the information being overwritten. In contrast, replacing information means that the earlier information is evicted to a higher level storage (e.g., main memory) and new information corresponding to a different logical address is submitted in its place. From this explanation, one skilled in the art should also now appreciate the differing activities which are permitted or prohibited for the remaining three rows of Table 2.

The fifth field of the tag information in FIG. 2 is preferably an error correction code (abbreviated "ECC" in FIG. 2) having an integer X number of bits. The ECC field indicates standard error correction information as known in the art. Additionally, note further that the field code may be replaced or further supplemented by other error correction techniques, such as a parity field or the like.

The sixth field of the tag information in FIG. 2 is preferably a map indicator formed by a single bit. In the preferred embodiment, the map indicator field may be set to indicate that the tag entry (and therefore also the location in L3 cache 26 corresponding to that tag information) has merely been reserved. In other words, if the map is set to this reserved state (e.g., 0), and an access is attempted to this tag entry, then detection of the reserved state map preferably causes an interrupt to the operating system. In response, the operating system may then be informed to take appropriate action to update with data the location in L3 cache 26 corresponding to that tag information. When taking this action, of course it is also contemplated that the map indicator will be switched to indicate a non-reserved state (e.g., 1), so that the next subsequent access to the tag information will then recognize that the tag information has been updated and properly characterizes either the pixel data or non-pixel information in the corresponding location in L3 cache 26.

The seventh and eighth fields of the tag information in FIG. 2 pertain only to pixel data as opposed to non-pixel information. Thus, in the instance where the one bit information type identifier (i.e., the first field in the tag information) indicates that the corresponding information is non-pixel information, then these seventh and eighth fields are irrelevant and may be used for other purposes. However, when the one bit information type identifier indicates that the tag information characterizes pixel data, then the fifth and six fields preferably provide the functionality described immediately below.

The seventh field of the tag information in FIG. 2 permits a linking function between different tag entries in TLB 24a and, consequently establishes a link between different blocks of pixel data in pixel data storage area 26a. Particularly, in the preferred embodiment, when a tag entry is accessed, then the field identifies the next tag (and hence next block of pixel data) to be accessed immediately following the current access. In this manner, therefore, numerous successive blocks of pixel data may be retrieved from pixel data storage area 26a without requiring CPU12 to generate separate logical addresses for each such block. Consequently, the pixel data retrieved in response to such a link may provide a more readily available stream of pixel data for output to DAC 40 and display 42. More particularly, recall from FIG. 1 pixel output FIFO 32 may indicate an empty or near empty status to address and arbitration circuit 24. Thus, when this occurs, the link field, as may be retrieved from the previous tag and stored into address and arbitration circuit 24, may then be used to issue the address for the next block of pixel data to be output by L3 cache 26. Additionally, note that the link field may be accomplished using various linking techniques and, thus, the field may be any integer number N bits in length. Lastly, note that in addition to a forward link as described above (i.e., where the link identifies the tag of the next accessed block), the link field may further include a backward link as well, where that backward link therefore identifies the tag of the previous block of pixel data. Indeed, still additional links could be included as may be ascertained by one skilled in the art.

The eighth field of the tag information in FIG. 2 is a pixel size field, and provides an indication of the number of bits characterizing a pixel for the bits in the block of pixel data in pixel data storage area 26a which correspond to the tag. In other words, under current technologies, a different number of bits may be used to characterize each pixel, with more bits typically used to provide a greater number of colors for a given pixel. Given this capacity, in the preferred embodiment and by way of example, assume that the pixel size field for a given line of tag information indicates a 16 bit pixel characterization (although other sizes could be used as well, such as 8 bits, 24 bits, 32 bits, and so forth). Thus, for the corresponding block of 4 Kbytes of pixel data in pixel data storage area 26a, each group of 16 bits is therefore determined to characterize a single pixel=s worth of data. Thus, this information may be conveyed to video controller 38 and used to control the depiction of the image on display 42. Additionally, note that the number of bits used by the pixel size field will depend on the number of different scenarios to be represented. For example, if there are four different contemplated pixel groupings (e.g., 8 bits, 16 bits, 32 bits, 64 bits), then any of these four may be represented in the pixel field by a total of 2 bits. Of course, greater variations may require a larger number of bits whereas fewer various require lesser bits; thus, to demonstrate this flexibility, FIG. 2 depicts that the pixel size field may be accomplished using any integer number T bits in length. Lastly, note that the pixel size field could include other attributes relating to a pixel, or that additional fields could be included in entry FIG. 2. One example, may identify the color palette corresponding to the pixel data. Other examples will be ascertainable by one skilled in the art.

Figure 3:
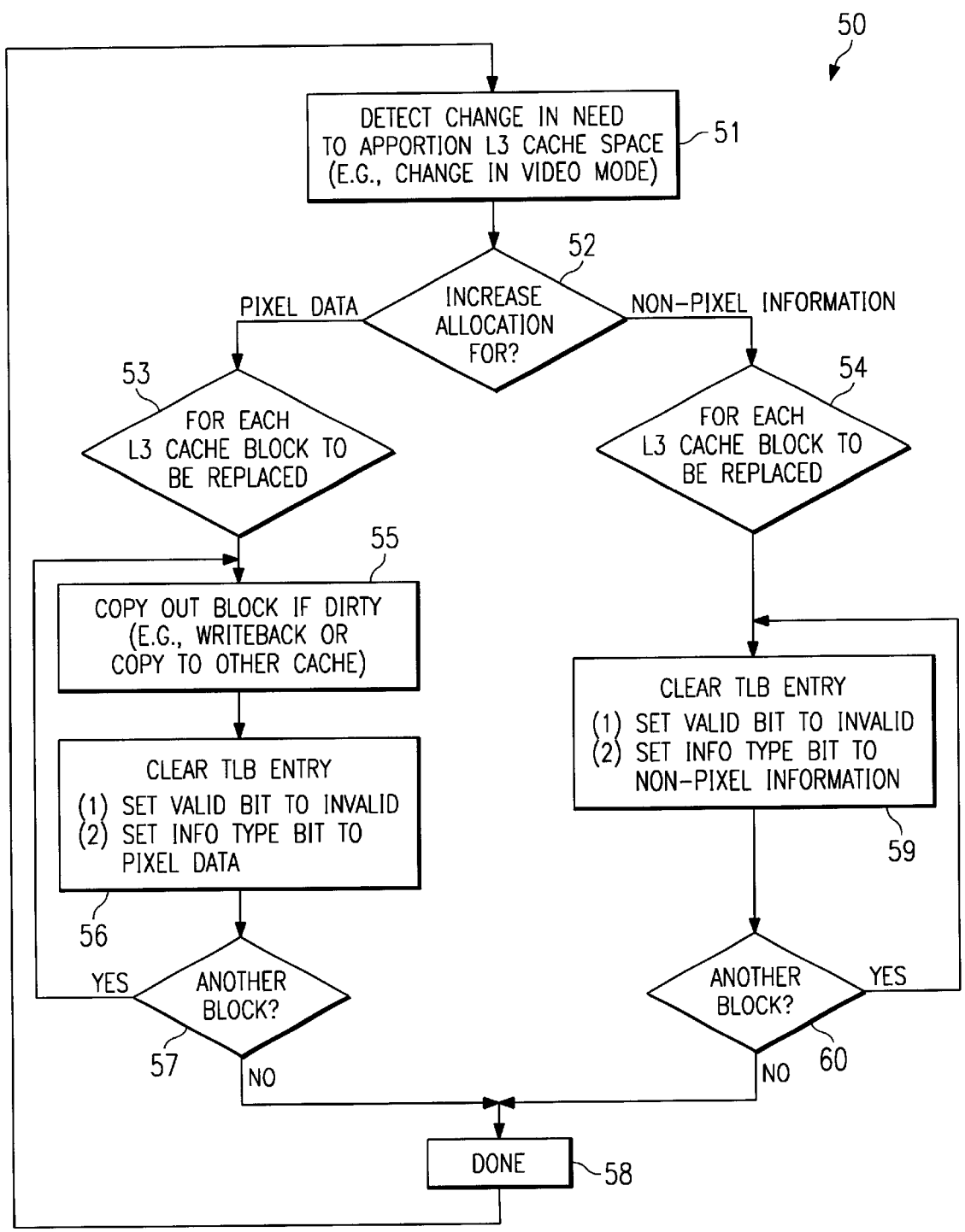
FIG. 3 illustrates a flowchart of a method of dynamically altering the apportionment of storage for L3 cache in the microprocessor of FIG. 1.

To further appreciate the preceding structure and principles, FIG. 3 provides a simplified flow chart of some of the operational steps of a method 50 of operation of microprocessor 10 in the context of apportioning L3 cache 26 to store both pixel data and non-pixel information. Method 50 begins with step 51, where microprocessor 10 detects a change in the need to apportion the total size of storage available in L3 cache 26 (e.g., 5 MBytes). In the preferred embodiment and as described, this need arises when the video mode is changed in the computer which is implementing microprocessor 10, and may be manifested by an output from video controller 38 to microprocessor 10. Thus, step 51 may be performed at start-up, or also may re-occur thereafter should the user change the video mode of operation. Note also that in detecting the change, step 51 determines the amount of the required change in apportionment, that is, whether additional space is required for pixel data or for non-pixel data and how much of such space is required to change. In the preferred embodiment, areas 26a and 26b are contiguous and a pointer or some other store keeps track of the current end of one area and, hence the beginning of the other area (i.e., the allocation between areas 26a and 26b). Thus, when the newly required amount is detected in step 51, it is used to adjust the value of this pointer accordingly. Given that information as well as some indication of the then current apportionment (as is preferably stored in address and arbitration circuit 24), method 50 proceeds as follows.

Step 52 represents simply a change in the flow of method 50 based on the type of information to be added to L3 cache 26 given the event detected in step 51. Thus, if the allocation of L3 cache 26 is to increase to allow storage of more pixel data, then method 50 continues from step 52 to step 53. Conversely, if the allocation of L3 cache 26 is to increase to allow storage of more non-pixel data, then method 50 continues from step 52 to step 54. Each of these alternative paths is discussed below.

Step 53 represents the beginning of a loop within method 50 when the apportionment of L3 cache 26 is changed to permit the storage of more pixel data. Note that, given the overall fixed size of L3 cache 26, then this change represents an increase in the number of the cache blocks in pixel data storage area 26a and, thus, a corresponding decrease in the number of the cache blocks in non-pixel information storage area 26b. Thus, this change in apportionment is accomplished by converting an appropriate number of blocks which currently store non-pixel information to a form ready to store pixel data. This number of blocks is that identified in step 51, that is, the number required to accommodate the event which gave rise to the change in apportionment. Following step 53, therefore, there are two steps 55 and 56 directed to making this change in apportionment, where each of those steps applies to each block being converted. Each of these steps is discussed below.

Step 55 is directed to the handling of the non-pixel information in storage area 26b which will be overwritten by the newly-added pixel data. Particularly, in step 55, method 50 ensures memory coherency with respect to a given block of non-pixel information by determining which, if any, of the non-pixel information in that block is dirty. In this regard, the above-discussed MESI bits may be used to make this determination. As known in the art, a dirty indication represents that a copy of information in the cache has been changed, but that change has not been provided to a higher level of memory. Thus, step 55 copies such dirty information to a higher level of memory. For example, this may be achieved through writeback of the non-pixel information to main memory. As another example, the non-pixel information may be copied to a higher level cache structure if one is available between L3 cache 26 and the system main memory. Next, method 50 continues from step 55 to step 56.

Step 56 is directed to the handling of the TLB entry corresponding to the non-pixel information which was evaluated in step 55. In step 56, method 50 clears the tag information in that entry of TLB 24a. In this regard, this clear operation involves at least two fields in the TLB 24a entry. For a first field, step 56 sets the valid tag, as may exist in the MESI information, to invalid. For a second field, step 56 sets the information type bit to pixel data. Given these steps, note that the TLB 24a entry is now ready to correspond to pixel data to be newly added to L3 cache 26. Next, method 50 continues from step 56 to step 57.

Step 57 ends the loop which started at step 53. Thus, if there is an additional block storing non-pixel information to be allocated to store pixel data, then method 50 returns from step 57 back to step 55, in which case steps 55 and 56 again repeat for that block. This process, therefore, continues until all L3 cache blocks to be converted from storing non-pixel information to pixel data have been processed. At that point, step 57 continues the flow to step 58, thereby concluding method 50.

Having explained the conversion of blocks in L3 cache 26 from non-pixel information storage to data pixel storage, recall the opposite is to occur when step 52 continues the flow to step 54. Looking then to step 54, it therefore represents the beginning of a loop within method 50 when the apportionment of L3 cache 26 is changed to permit the storage of more non-pixel information. Again, given the overall fixed size of L3 cache 26, then this change represents an increase in the number of the cache blocks in non-pixel information storage area 26b and, thus, a corresponding decrease in the number of the cache blocks in pixel data storage area 26a. This change in apportionment is accomplished by converting an appropriate number of blocks which currently store pixel data to a form ready to store non-pixel information. Following step 54, therefore, there step 59 directed to making this change in apportionment, where step 59 applies to each block being converted as further appreciated below.

Step 59 is directed to the handling of the TLB entry corresponding to pixel data in storage area 26a which will be overwritten by the newly-added non-pixel information. In step 59, method 50 clears the tag information in that entry of TLB 24a. In this regard, this clear operation involves the same at least two fields in the TLB 24a entry as changed in step 55. Thus, for the first field, step 59 sets the valid tag (e.g., from MESJ) to invalid. The second field is again the information type bit. However, here the change in state is the opposite than that described in step 55, that is, here step 59 sets that bit to non-pixel information. Given these steps, note that the TLB 24a entry is now ready to correspond to non-pixel information to be newly added to L3 cache 26. Next, method 50 continues from step 59 to step 60. Given this flow, note also that between steps 54 and 60 there is no step comparable to step 55 which applies to a conversion readying for more pixel data. Thus, one skilled in the art will appreciate that when pixel data is stored in L3 cache 26 and the locations storing that information is to be overwritten by non-pixel information, then in the preferred embodiment there is no copying out of the pixel data; instead, it is merely overwritten by the newly-added on-pixel information.

Step 60 ends the loop which started at step 53. Thus, if there is an additional block storing pixel data to be allocated to store non-pixel information, then method 50 returns from step 60 back to step 59, in which case step 59 again repeats for that block. This process, therefore, continues until all L3 cache blocks to be converted from storing pixel data to non-pixel information have been processed. At that point, step 60 continues the flow to step 58, thereby concluding method 50.

Lastly with respect to FIG. 3, note that after step 58 the flow is shown to return to step 51. Of course, numerous other activities may take place before step 51 once again occurs, but this return of flow is included to suggest that after a given apportionment another event may occur (e.g., another change in the video mode) where that change may once again be detected by step 51 and the steps thereafter may change the apportionment of L3 cache 26 as between pixel data and non-pixel information.

Figure 4:
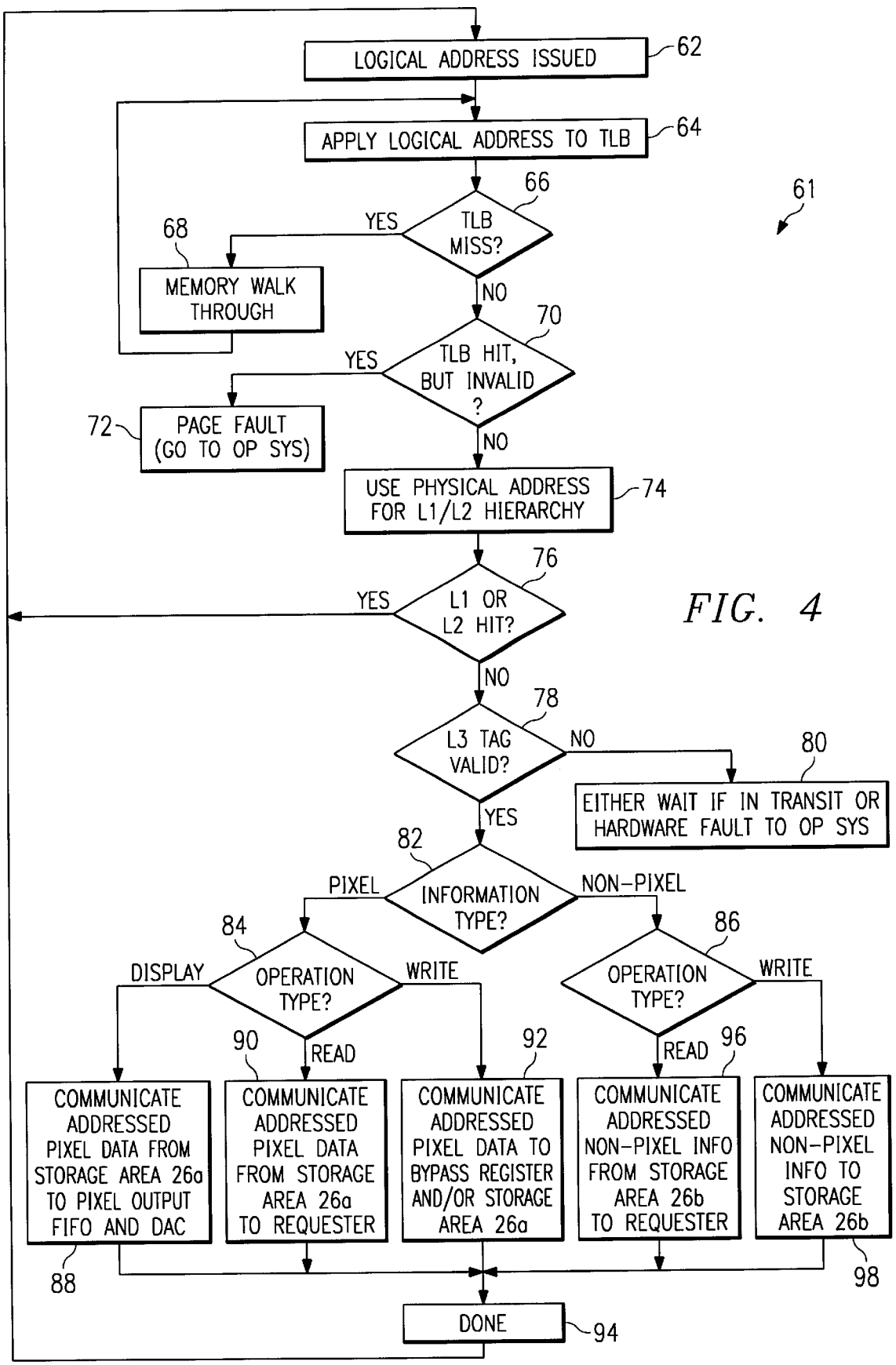
FIG. 4 illustrates a flowchart of a method of addressing the various levels of memory in the microprocessor of FIG. 1.

Having generally discussed the accessing of information in L3 cache 26, FIG. 4 illustrates a flow chart of some of those steps and further describes a method 61 of operation of microprocessor 10 in the context of addressing its memory hierarchy which includes L3 cache 26. Method 61 begins in step 62 when a unit such as CPU 12 issues a logical address directed at information stored in the system memory. By definition, however, information stored in external memory (e.g., main memory or on hard storage) also may be stored within one or more of the caches accessible by CPU 12. Thus, the remaining steps illustrate how such information may be retrieved from those caches.

In step 64, method 61 applies the logical address from CPU 12 to TLB 24a. TLB 24a may respond in various manners. For example, TLB 24a may issue a miss, thereby indicating that it is not currently storing an address translation for the logical address issued by CPU 12 in step 62. Alternatively, TLB 24a may have an address translation, but its tag may indicate that the translation has been marked invalid. Still further, TLB 24a may have a valid address translation; in this case, note that the valid translation will provide a physical address to then be applied to determine if there is a hit in either L1 cache 16 or L2 cache 20, and the valid translation also provides an index and tag information (including that from FIG. 2) for a potential access to L3 cache 26. In any event, given a response from TLB 24a in step 64, method 61 continues to step 66.

In step 66, method 61 determines whether TLB 24a issued a miss in step 64. If so, method 61 continues to step 68. Step 68 then performs a memory table walk through as is known in the art as common in response to a TLB miss. In other words, the memory walk through identifies the proper address translation and it may then be stored to TLB 24a. Consequently, after step. 68 method 61 returns to step 64, which once again applies the issued address to TLB 24a and which therefore should now result in locating a valid translation as described in the preceding paragraph. For either this valid translation based on this iteration, or due to a hit from the initial access to TLB 24a, method 61 next continues to step 70.

In step 70, method 61 determines whether the hit in TLB 24a corresponds to valid information. In other words, recall from the preceding discussion of step 64 that despite TLB 24a having an address translation, that translation also may be marked invalid. In this case, step 70 directs the method flow to step 72. In step 72, there is a hardware fault by microprocessor 10 of a page fault and, more particularly, this indication is directed to the operating system. Thus, the hardware alone at this point takes no further action but recourse is instead taken in whatever fashion deemed acceptable by the operating system to correct the page fault. Eventually, that is, either after correction or assuming that the original hit to TLB 24a corresponds to a valid translation, method 61 continues to step 74.

In step 74 method 61 applies the physical address from the TLB 24a translation to L1 cache 16 and possibly to L2 cache 20 in a manner known in the art. For example, to save time the application of the address to each of these caches may be concurrent or, alternatively, the application of the address to L2 cache 20 may occur only if a miss is first detected in L1 cache 16. At the conclusion of step 74, a hit to valid information will either have occurred in one of these two caches or both will have resulted in a miss (or a hit, but to invalid information). Thus, step 76 determines which of these two instances occurred. If step 76 determines that a hit to valid information occurred in either L1 cache 16 or L2 cache 20, then the information corresponding to the address is provided by the cache which had the hit and method 61 returns to step 62 to await the issuance of the next address by CPU 12. On the other hand, if both L1 cache 16 and L2 cache 20 responded with misses to the physical address from TLB 24a (or a hit of invalid information), then method 61 continues to step 78.

In step 78, method 61 evaluates the tag issued by TLB 24a and corresponding L3 cache 26. More specifically, it is determined whether the tag is marked valid or invalid. If the tag is invalid, then method 61 continues to step 80. If the tag is valid, then method 61 continues to step 82. Each of these alternative is discussed below.

In step 80, having detected an invalid tag corresponding to L3 cache 26, one of two actions occurs. As a first action in response to an invalid tag, note that the invalid tag may be an indication, which can be confirmed by looking to an additional indicator (either within the tag or elsewhere), that the information corresponding to the address is in transit to L3 cache 26. A transit indication of this type suggests that the information sought by the address is actually currently being directed to L3 cache 26 and, thus, is likely to be there in a valid manner within an acceptably short period of time. If this is the case, then step 80 may merely wait some duration of time, and then re-evaluate whether the tag at issue in TLB 24a has now become valid (i.e., whether the information which was in transit has now been fully stored to L3 cache 26). As a second action in response to an invalid tag, then step 80 either immediately, or in response to determining that the information sought is not in transit, provides a hardware fault to the operating system. Thus, the hardware alone at this point takes no further action but recourse is instead taken in whatever fashion deemed acceptable by the operating system to correct what may now be considered as a miss in each of L1 cache 16, L2 cache 20, and L3 cache 26.

From step 82 forward, the reader should appreciate the remaining steps as demonstrating the operations described earlier in connection with FIG. 1 using CPU 12 as an example of a circuit providing an address and then either reading or writing non-pixel information, or either reading, writing, or requesting a display operation with respect to pixel data. By way of summarization, therefore, the remaining steps are also shown in FIG. 4 and briefly discussed below.

In step 82, having detected a valid tag corresponding to L3 cache 26, it is next determined which type of information corresponds to the address at issue. In other words, it is now known that the desired information is stored in L3 cache 26, and thus it is further determined, by reviewing the information type indicator of the tag (see the appropriate field in FIG. 2), whether the information is pixel data or non-pixel information. In response, method 61 continues to step 84 if the information is pixel data or, alternatively, method 61 continues to step 86 if the information in non-pixel information. Lastly, therefore, the steps following steps 84 and 86 operate in the manner described earlier and according to the type of information. While the details of such actions therefore may be reviewed from the previous discussion, briefly note the following.

Step 84 directs the flow of method based on the operation type which corresponded to the addressed pixel data. If the operation is to display the pixel data, then method 61 continues to step 88 which communicates the addressed pixel data from storage area 26a to pixel output FIFO 32. From the earlier discussion, it will be further recognized then that this pixel data may be output from pixel output FIFO 32 to DAC 40 and ultimately to display 42. If the operation for the addressed pixel data is a read, then step 90 communicates the addressed pixel data from storage area 26a to the requester of the data (e.g., CPU 12). In this regard, recall also from the earlier discussion of FIG. 1 that this communication of the addressed pixel data may be via bus 28 to bypass register 36 and, thus, available to CPU 12. Given the above, one skilled in the art should appreciate that the addressed information is immediately available to CPU 12 via bypass register 36, or may pass to a lower level cache starting with L2 cache 20. Lastly, if the operation for the addressed pixel data is a write, then step 92 communicates the addressed pixel data from the writing device back to storage area 26a (which again may be via bypass register 36). After any of steps 88, 90, and 92, method 61 concludes to step 94 and returns to step 62 where a newly issued logical address once again is processed through the steps of method 61.

Step 86 directs the flow of method based on the operation type which corresponded to the addressed non-pixel information. If the operation for the addressed non-pixel information is a read, then step 96 communicates the addressed non-pixel information from storage area 26b to the requester of the data (e.g., CPU 12). Once again, this communication of the addressed non-pixel information may be via bus 28 to bypass register 36 and, thus, available to CPU 12 or, alternatively, may be communicated to CPU 12 via L2 cache 20 and then L1 cache 16. Conversely, if the operation for the addressed non-pixel information is a write, then step 98 communicates the addressed non-pixel information from the writing device back to storage area 26b (which again may be via bypass register 36 or through L1 cache 16 and then L2 cache 20). After either of steps 96 or 98, method 61 concludes to step 94 and returns to step 62 where once again a newly issued logical address may be processed through the steps of method 61. Concluding FIG. 4, note that while the flow is shown to return from step 94 to step 62, one or more other activities may take place before step 62 once again occurs; nevertheless, this return of flow is included to suggest that after a given memory access other interim events may occur before the next memory access is desired, but once such an access is desired method 61 once again commences by step 62.

From the above, it may be appreciated that the above embodiments provides numerous benefits in the context of computer systems. For example, a hierarchical memory system may included within the computer system where one (or more) caches of the hierarchy are operable to store both pixel data and non-pixel information. Consequently, the combined cache permits the CPU(s) of the system to have equal access to both pixel data and non-pixel information. As another example, by including the ability to dynamically apportion the storage space of the multi-purpose cache, the computer system may be re-configured periodically to accommodate the then-existing storage demands with an emphasis towards either pixel data or non-pixel information. As another example, the various tag information set forth above may further facilitate efficient use of the pixel data as it retrieved from the multi-purpose cache. Still additional examples will be appreciated by one skilled in the art. As yet a final benefit, note that the above demonstrates various alternative aspects which thereby present various embodiments within the present inventive scope. Thus, while the present embodiments have been described in detail, various substitutions, modifications or alterations could be made to the descriptions set forth above without departing from the inventive scope which is defined by the following claims.

What is claimed is:

1. A computer system, comprising:
   a central processing unit;
   a memory hierarchy, comprising:
      a first cache memory operable to store non-pixel information, wherein the non-pixel information is accessible for processing by the central processing unit; and
      a second cache memory, higher in the memory hierarchy than the first cache memory, and having a number of storage locations and operable to store non-pixel information and pixel data;
   cache control circuitry for dynamically apportioning the number of storage locations such that a first group of the storage locations are for storing non-pixel information and such that a second group of the storage locations are for storing pixel data;
   a video controller for operating under a plurality of video modes; and
   wherein the cache control circuitry for dynamically apportioning the number of storage locations dynamically apportions the number of storage locations in response to a currently selected one of the plurality of video modes.

2. A computer system, comprising:

a central processing unit;

a memory hierarchy, comprising:
   a first cache memory operable to store non-pixel information, wherein the non-pixel information is accessible for processing by the central processing unit; and
   a second cache memory, higher in the memory hierarchy than the first cache memory, and having a number of storage locations and operable to store non-pixel information and pixel data;

cache control circuitry for dynamically apportioning the number of storage locations such that a first group of the storage locations are for storing non-pixel information and such that a second group of the storage locations are for storing pixel data; and wherein the cache control circuitry comprises a translation lookaside buffer having a plurality of entries, each of the plurality of entries corresponding to one of the number of storage locations, each of the plurality of entries comprises an information type indicator for indicating whether the corresponding one of the number of storage locations stores pixel data or non-pixel information.

3. A computer system, wherein comprising:

a central processing unit;

a memory hierarchy, comprising:
   a first cache memory operable to store non-pixel information, wherein the non-pixel information is accessible for processing by the central processing unit; and
   a second cache memory, higher in the memory hierarchy than the first cache memory, and having a number of storage locations and operable to store non-pixel information and pixel data;

cache control circuitry for dynamically apportioning the number of storage locations such that a first group of the storage locations are for storing non-pixel Information and such that a second group of the storage locations are for storing pixel data; and wherein the cache control circuitry comprises a translation lookaside buffer having a plurality of entries, each of the plurality of entries corresponding to one of the number of storage locations, each of the plurality of entries comprises a status indicator for indicating whether the information in the corresponding one of the number of storage locations stores may be replaced.

4. A computer system, comprising:

a central processing unit;

a memory hierarchy, comprising:
   a first cache memory operable to store non-pixel information, wherein the non-pixel information is accessible for processing by the central processing unit; and
   a second cache memory, higher in the memory hierarchy than the first cache memory, and having a number of storage locations and operable to store non-pixel information and pixel data;

cache control circuitry for dynamically apportioning the number of storage locations such that a first group of the storage locations are for storing non-pixel information and such that a second group of the storage locations are for storing pixel data; and wherein the cache control circuitry comprises a translation lookaside buffer having a plurality of entries, each of the plurality of entries corresponding to one of the number of storage locations, each of the plurality of entries corresponding to one of the number of storage locations which stores pixel data comprises a link indicator, wherein the link indicator is operable such that a first link indicator corresponding to a first one of the number of storage locations storing pixel data may specify a second one of the number of storage locations storing pixel data, wherein the pixel data of the second one of the number of storage locations is to be output immediately after outputting the pixel data of the first one of the number of storage locations.

5. A computer system, comprising:

a central processing unit;

a memory hierarchy, comprising:
   a first cache memory operable to store non-pixel information, wherein the non-pixel information is accessible for processing by the central processing unit; and
   a second cache memory, higher in the memory hierarchy than the first cache memory, and having a number of storage locations and operable to store non-pixel information and pixel data;

cache control circuitry for dynamically apportioning the number of storage locations such that a first group of the storage locations are for storing non-pixel information and such that a second group of the storage locations are for storing pixel data; and wherein the cache control circuitry comprises a translation lookaside buffer having a plurality of entries, each of the plurality of entries corresponding to one of the number of storage, locations, each of the plurality of entries corresponding to one of the number of storage locations which stores pixel data comprises a pixel size indicator, wherein each pixel size indicator specifies, for the pixel data in the second cache memory corresponding to the each entry, a number of bits in the pixel data corresponding to a display pixel.

6. A computer system, comprising:

a central processing unit;

a memory hierarchy, comprising:
   a first cache memory operable to store non-pixel information, wherein the non-pixel information is accessible for processing by the central processing unit; and
   a second cache memory, higher in the memory hierarchy than the first cache memory, and having a number of storage locations and operable to store non-pixel information and pixel data;

cache control circuitry for dynamically apportioning the number of storage locations such that a first group of the storage locations are for storing non-pixel information and such that a second group of the storage locations are for storing pixel data; and wherein the cache control circuitry comprises a translation lookaside buffer having a plurality of entries, each of the plurality of entries corresponding to one of the number of storage locations;

wherein each of the plurality of entries comprises an information type indicator for indicating whether the corresponding one of the number of storage locations stores pixel data or non-pixel information;

wherein each of the plurality of entries comprises a status indicator for indicating whether the information in the corresponding one of the number of storage locations stores may be written;

wherein each of the plurality of entries comprises a status indicator for indicating whether the information in the corresponding one of the number of storage locations stores may be replaced;

wherein each of the plurality of entries corresponding to one of the number of storage locations which stores pixel data comprises a link indicator, wherein the link indicator is operable such that a first link indicator corresponding to a first one of the number of storage locations storing pixel data may specify a second one of the number of storage locations storing pixel data, wherein the pixel data of the second one of the number of storage locations is to be output immediately after outputting the pixel data of the first one of the number of storage locations; and wherein each of the plurality of entries corresponding to one of the number of storage locations which stores pixel data comprises a pixel size indicator, wherein each pixel size indicator specifies, for the pixel data in the second cache memory corresponding to the each entry, a number of bits in the pixel data corresponding to a display pixel.

7. A method of operating a computer system, comprising:

operating a central processing unit;

first, storing information in a memory hierarchy, comprising the steps of:
  storing non-pixel information in a first cache memory, wherein the non-pixel information is accessible for processing by the central processing unit; and
  storing non-pixel information in a first group of storage locations in a second cache memory higher in the memory hierarchy than the first cache memory;
  storing pixel data in a second group of storage locations in the second cache memory; and second, dynamically re-apportioning a number of storage locations in the first group of storage locations relative to a number of storage locations in the second group of storage locations;

third, the steps of:
  storing non-pixel information in the dynamically reapportioned first group of storage locations in the second cache memory;
  storing pixel data in the dynamically reapportioned second group of storage locations in the second cache memory;

fourth, operating a video controller under a plurality of video modes; and wherein the step of dynamically apportioning the number of storage locations dynamically apportions the number of storage locations in response to a currently selected one of the plurality of video modes.

8. A computer system, comprising:

a central processing unit;

a cache memory and having a number of storage locations and operable to store non-pixel information and pixel data;

cache control circuitry for dynamically apportioning the number of storage locations such that a first group of the storage locations are for storing non-pixel information and such that a second group of the storage locations are for storing pixel data;

a video controller for operating under a plurality of video modes; and wherein the cache control circuitry for dynamically apportioning the number of storage locations dynamically apportions the number of storage locations in response to a currently selected one of the plurality of video modes.

9. A computer system, comprising:

a central processing unit;

a cache memory and having a number of storage locations and operable to store non-pixel information and pixel data;

cache control circuitry for dynamically apportioning the number of storage locations such that a first group of the storage locations are for storing non-pixel information and such that a second group of the storage locations are for storing pixel data, the cache control circuitry comprising a translation lookaside buffer having a plurality of entries, each of the plurality of entries corresponding to one of the number of storage locations, each of the plurality of entries comprises an information type indicator for indicating whether the corresponding one of the number of storage locations stores pixel data or non-pixel information.

10. A computer system, comprising:

a central processing unit;

a cache memory and having a number of storage locations and operable to store non-pixel information and pixel data;

cache control circuitry for dynamically apportioning the number of storage locations such that a first group of the storage locations are for storing non-pixel information and such that a second group of the storage locations are for storing pixel data, the cache control circuitry comprising a translation lookaside buffer having a plurality of entries, each of the plurality of entries corresponding to one of the number of storage locations, each of the plurality of entries comprises a status indicator for indicating whether the information in the corresponding,one-of the number of storage locations stores may be replaced.

11. A computer system, comprising:

a central processing unit;

a cache memory and having a number of storage locations and operable to store non-pixel information and pixel data;

cache control circuitry for dynamically apportioning the number of storage locations such that a first group of the storage locations are for storing non-pixel information and such that a second group of the storage locations are for storing pixel data, the cache control circuitry comprising a translation lookaside buffer having a plurality of entries, each of the plurality of entries corresponding to one of the number of storage locations, each of the plurality of entries corresponding to one of the number of storage locations which stores pixel data comprises a link indicator, wherein the link indicator is operable such that a first link indicator corresponding to a first one of the number of storage locations storing pixel data may specify a second one of the number of storage locations storing pixel data, wherein the pixel data of the second one of the number of storage locations is to be output immediately after outputting the pixel data of the first one of the number of storage locations.

12. A computer system, comprising:

a central processing unit;

a cache memory and having a number of storage locations and operable to store non-pixel information and pixel data;

cache control circuitry for dynamically apportioning the number of storage locations such that a first group of the storage locations are for storing non-pixel information and such that a second group of the storage locations are for storing pixel data, the cache control circuitry comprising a translation lookaside buffer having a plurality of entries, each of the plurality of entries corresponding to one of the number of storage locations, each of the plurality of entries corresponding to one of the number of storage locations which stores pixel data comprises a pixel size indicator, wherein each pixel size indicator specifies, for the pixel data in the cache memory corresponding to the each entry, a number of bits in the pixel data corresponding to a display pixel.

13. A computer system, comprising:

a central processing unit;

a cache memory and having a number of storage locations and operable to store non-pixel information and pixel data;

cache control circuitry for dynamically apportioning the number of storage locations such that a first group of the storage locations are for storing non-pixel information and such that a second group of the storage locations are for storing pixel data, the cache control circuitry comprising a translation lookaside buffer having a plurality of entries, each of the plurality of entries corresponding to one of the number of storage locations;

wherein each of the plurality of entries comprises an information type indicator for indicating whether the corresponding one of the number of storage locations stores pixel data or non-pixel information;

wherein each of the plurality of entries comprises a status indicator for indicating whether the information in the corresponding one of the number of storage locations stores may be written;

wherein each of the plurality of entries comprises a status indicator for indicating whether the information in the corresponding one of the number of storage locations stores may be replaced;

wherein each of the plurality of entries corresponding to one of the number of storage locations which stores pixel data comprises a link indicator, wherein the link indicator is operable such that a first link indicator corresponding to a first one of the number of storage locations storing pixel data may specify a second one-of the number of storage locations storing pixel data, wherein the pixel data of the second one of the number of storage locations is to be output immediately after outputting the pixel data of the first one of the number of storage locations; and wherein each of the plurality of entries corresponding to one of the number of storage locations which stores pixel data comprises a pixel size indicator, wherein each pixel size indicator specifies, for the pixel data in the cache memory corresponding to the each entry, a number of bits in the pixel data corresponding to a display pixel.

* * * * *